United States Patent [19]

Burke et al.

[11] 4,375,251

[45] Mar. 1, 1983

[54] AUTOMATIC WEAR ADJUSTER FOR DRUM BRAKES

[75] Inventors: John P. Burke, Leamington Spa; Alastair J. Young, Kenilworth, both of England

[73] Assignee: Automotive Products Limited, Leamington Spa, England

[21] Appl. No.: 182,042

[22] Filed: Aug. 28, 1980

[30] Foreign Application Priority Data

Aug. 31, 1979 [GB] United Kingdom ............... 7930314

[51] Int. Cl.³ .............................................. F16D 65/56
[52] U.S. Cl. ................................ 188/79.5 P; 188/328; 188/196 BA
[58] Field of Search ........ 188/196 BA, 196 B, 196 A, 188/79.5 R, 79.5 GE, 79.5 GC, 79.5 GT, 79.5 K, 79.5 P, 79.5 M, 327–330; 192/111 A

[56] References Cited

U.S. PATENT DOCUMENTS

| | | | |
|---|---|---|---|
| 3,400,787 | 9/1968 | Keller et al. | 188/79.5 GT X |
| 3,706,360 | 12/1972 | Nyunoya | 188/79.5 P |
| 3,709,334 | 1/1973 | Kondo et al. | 188/79.5 P |
| 4,121,701 | 10/1978 | Gestkoff | 188/196 B X |
| 4,174,770 | 11/1979 | Courbot | 188/196 BA X |
| 4,217,973 | 8/1980 | Johns et al. | 188/79.5 P X |
| 4,232,766 | 11/1980 | Rupprecht | 188/79.5 P |

FOREIGN PATENT DOCUMENTS

| | | |
|---|---|---|
| 472103 | 9/1937 | United Kingdom . |
| 1150960 | 5/1969 | United Kingdom . |
| 1280968 | 7/1972 | United Kingdom . |
| 1406069 | 9/1975 | United Kingdom . |
| 1425383 | 2/1976 | United Kingdom . |
| 1460847 | 1/1977 | United Kingdom . |
| 1504557 | 3/1978 | United Kingdom . |

Primary Examiner—Douglas C. Butler
Attorney, Agent, or Firm—Kemon & Estabrook

[57] ABSTRACT

An internal drum brake of the kind including a strut between a hand brake lever pivoted on one shoe and the other shoe, has a wear adjuster comprising a pair of screw-threaded members with a pawl and pawl wheel for relative rotation thereof on operation of the service brake system, the axis of the screw-threaded members intercepting the line of action between the shoe and an abutment which limits return movement of the shoe to a brake-released position, one of the members having a spacer between the shoe and the abutment, the spacing effect of the spacer being changed on relative rotation of the screw-threaded members.

7 Claims, 7 Drawing Figures

AUTOMATIC WEAR ADJUSTER FOR DRUM BRAKES

This invention relates to automatic wear adjusters for conventional drum brakes suitable for motor vehicles.

A drum brake normally includes a fixed back plate, a pair of arcuate brake shoes mounted on the back plate, expanding means for urging the brake shoes apart generally radially of the back plate and a rotatable brake drum, co-axial with the back plate, and against which the brake shoes act.

Such a brake may have independent service brake and parking brake expanding means. By service brake we mean the primary vehicle braking system, usually hydraulically actuable, and by parking brake the secondary vehicle braking system, usually mechanically actuable.

Wear adjusters are normally incorporated in drum brake to maintain a substantially fixed clearance between the brake shoes and the brake drum to compensate for wear of the brake shoe linings.

Such adjusters are desirable as they maintain the working travel of the expanding means within the range of the vehicle brake actuating system. Automatic operation of wear adjusters as the brake is actuated is known.

This invention is particularly concerned with wear adjusters for drum brakes having a strut between a handbrake lever pivoted on one shoe, and the other shoe. Prior art adjuster mechanisms for such brakes have included screw-threaded members in the strut, the members being relatively rotatable on operation of the brake to lengthen the strut and so compensate for wear of the brake shoe linings. One problem with such adjuster mechanisms is that they increase the space required for the strut in a critical area between the brake actuating cylinder and the rotatable hub. This arrangement further requires that the screw threads of the members transmit brake actuating loads on operation of the handbrake.

The present invention offers an adjuster mechanism which does not substantially encroach on the space between the brake actuating cylinder and the rotatable hub and which includes relatively rotatable members which are substantially free from transmission of brake actuating loads. The invention is also applicable to automatic adjustment of single brake shoes, of, for example, a twin leading shoe brake.

According to the invention there is provided an internal drum brake wear adjuster, for maintaining a given maximum clearance between the friction facing of a brake shoe and the brake drum against which it acts, and comprising a pair of screw-threaded members with step by step means for relative rotation thereof on operation of the service brake, characterised thereby that the axis of the screw-threaded members intercepts the line of action between the shoe and an abutment which, in use, limits the return movement of the shoe to a brake released position, one of the screw-threaded members having a spacer between the shoe and the abutment, and relative rotation of the screw-threaded members changing the spacing effect of the spacer and thus changing the brake released position of the brake shoe.

Other features of the invention are included in the following description of five preferred embodiments shown, by way of example, in the accompanying drawings in which.

Figure 1:
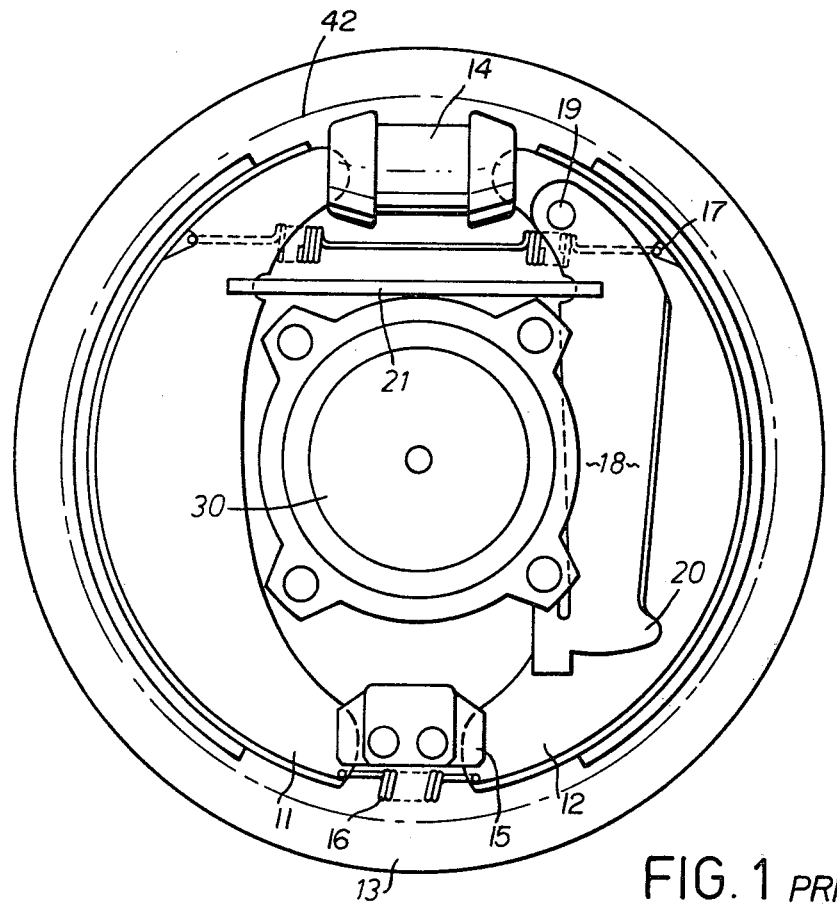
FIG. 1 is a plan view of a conventional drum brake assembly having means for hydraulic and mechanical actuation of the brake shoes.

With reference to FIG. 1 there is shown a conventional drum brake assembly onto which the embodiments of the invention could be incorporated.

A pair of brake shoes 11,12, mounted against a back plate 13 by any known means, can be urged apart, by a double acting hydraulic wheel cylinder 14, about a fixed abutment 15. Return springs 16 and 17 urge the brake shoes to the rest position. A rotatable hub 30 carries a brake drum indicated by the chain-dot line 42.

A hand brake lever 18, pivoted on that web end of the brake shoe 12 adjacent the wheel cylinder 14, is rotatable clockwise about the pivot 19 by a handbrake cable (not shown) attached to the lever free end. The lever 18 may have a edge portion 20 for abutment with the brake shoe 12 in the brake released position.

A cross strut 21 has one fork end engaging the lever 18 adjacent its pivot and a second fork end engaging the web of the other brake shoe 11. Pull on the lever 18 causes the brake shoes to be urged apart about the abutment 15 against the brake drum 42; such a brake arrangement is well known.

Figure 2:
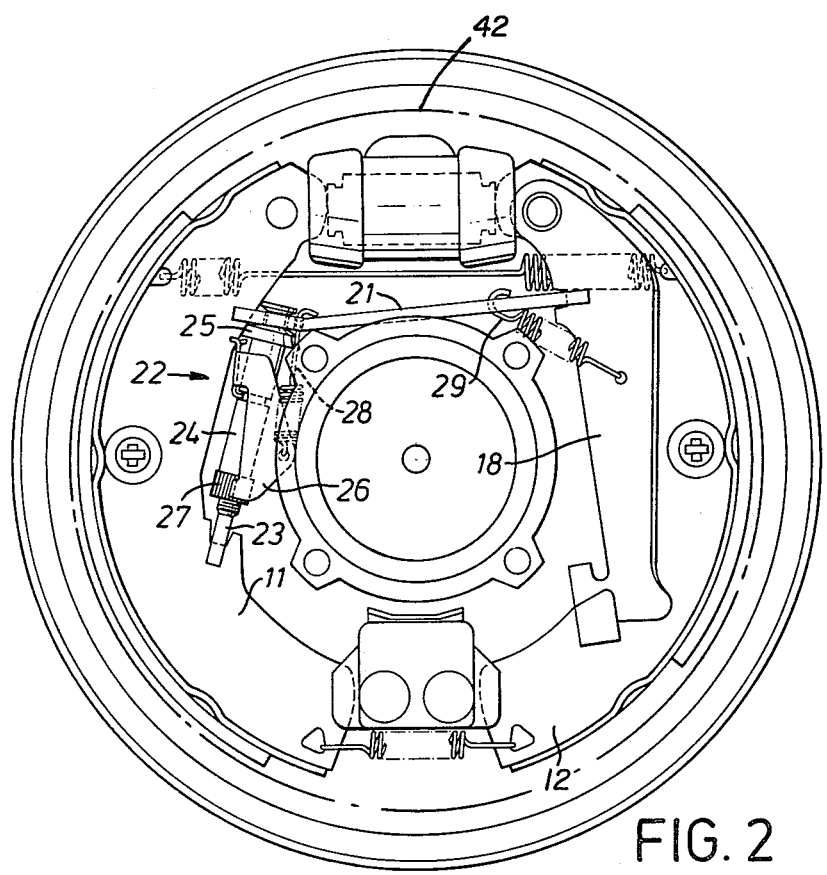
FIG. 2 shows such a brake incorporating the first embodiment of the invention.

With reference to FIG. 2 there is shown an automatic adjuster mounted on the brake shoe 11 which is responsive only to hydraulic actuation of the brake shoes.

A screw strut adjuster 22 has a male threaded member 23 whose free forked end is located on a shoulder of the brake shoe web. The free end of a co-operating female threaded member 24 is located in a bore in the cross strut 21', the member 24 being spaced from the shoe 11 by an enlarged diameter disc portion 25, as shown. The adjacent forked end of the cross strut 21' thus provides only lateral location of the adjuster 22, strut loads being transmitted through the adjuster to the brake shoe 11.

A pivotable pawl 26 is located by a groove formed on the member 24 and by the web of the brake shoe 11. The pawl 26 engages a ratchet wheel 27 formed on the member 24, and is biased anti-clockwise about its location by a tension spring 28 reacting against the cross strut 21'. The spring 28 thus holds the strut 21' against the disc portion 25, as shown.

The profile of the brake shoe web adjacent the disc portion 25 of the member 24 is shaped such that as the screw strut is extended the shoe 11 is moved outward relative to the cross strut 21'.

A tension spring 29 ensures engagement of the cross strut 21' and the handbrake lever 18 at all times.

Operation of this embodiment is as follows:

As viewed in FIG. 2, the brake shoes are released and the cross strut 21' is under a compressive load from the brake shoe pull-off springs.

Mechanical actuation of the brake shoes, through the hand brake lever 18, places the cross strut 21' under a further compressive load. The adjuster 22 transmits this load to the brake shoe 11 through the members 23 and 24. There is no relative movement in the adjuster assembly and hence no extension of the screw strut. The adjuster 22 remains in contact with the shoe 11 at all times.

Hydraulic actuation of the brake shoes renders the cross strut 21' free of any transmitted load. The hand brake lever 18 moves outward, with the brake shoe 12 by virtue of the pivot 19.

The cross strut 21' moves with the lever 18 by virtue of the spring 29, and the screw strut is pivoted away from the web of shoe 11 about the fork end of the member 23. The cross strut remains located by its forked end on the brake shoe 11.

The pawl 26 will pivot anti-clockwise relative to the screw strut and, by engagement with a generally radial face of the ratchet wheel teeth, tend to rotate the wheel 27 to extend the screw strut.

As the brake shoes are released, the inherent friction in the screw strut threads prevents rotation of the ratchet wheel 27 as the pawl 26 rides up the adjacent tangential face of the next ratchet wheel tooth.

Clearly, as the brake shoe friction linings wear the return stroke of the pawl 26 will carry it over a ratchet tooth peak to engage a further radial tooth face.

Thus the screw strut is extended and the brakes shoes 11,12 held further apart when released.

The lost motion in the adjuster linkage, necessary to provide a running clearance between the brake shoes and the brake drum, is provided by the initial angular movement of the pawl 26 relative to the screw strut 22.

Figure 3:
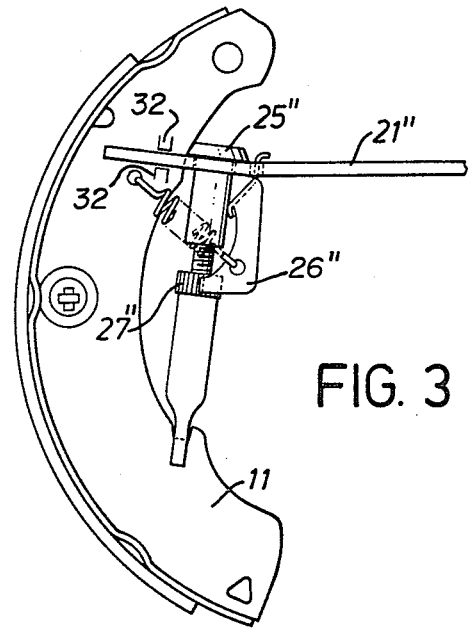
FIG. 3 is a modification to the brake depicted in FIG. 2 and comprising the second embodiment of the invention.

The embodiment shown in FIG. 3 is a modification to the previous example, similar parts are given the same reference numerals with alternative suffixes.

The cross strut 21" is guided between fixed lugs 32 on the brake shoe 11, and the screw strut is arranged to drive upward through the cross strut against a cam surface on the shoe web as previously described. The ratchet wheel 27" is turned, in the opposite direction to that of the previous embodiment, by the pawl 26". The major operational difference in this embodiment is that the cross strut 21" does not change its angular position relative to the brake shoes and the disc portion 25" drives away from the strut on rotation of the ratchet wheel 27".

Yet a further modification, suitable for either of the previous embodiments, would be to incorporate a snail cam on the screw strut, in place of the disc portion 25 or 25"', for co-operation with a radial shoe web profile.

Figure 5:
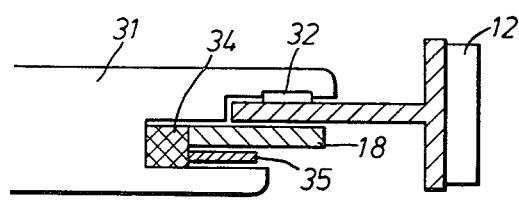
FIG. 5 is a part-sectional view through the brake depicted in FIG. 4.
Figure 4:
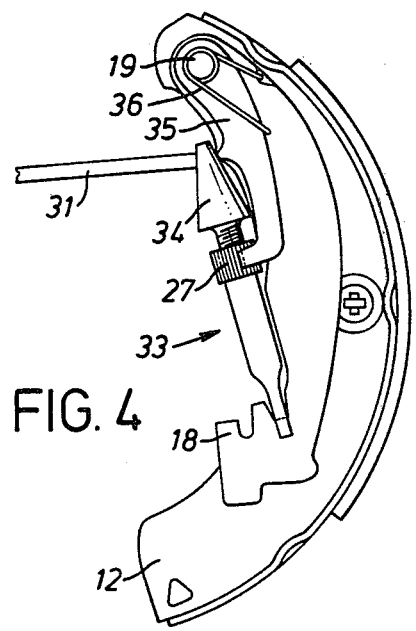
FIG. 4 shows the third embodiment of the invention.

With reference to FIGS. 4 and 5, there is shown a screw strut adjuster, following the principles of the previous embodiments, mounted on the hand brake lever.

The cross strut 31 is guided on the brake shoe 12 between fixed lugs 32. A screw strut adjuster 33, pivotably located on the hand brake lever 18, has an arrow head wedge 34 located between the cross strut 31 and the lever 18. A pawl 35, located on lever pivot 19, is biased clockwise against the wedge 34 by a hairpin spring 36 reacting against the lever 18.

Mechanical actuation of the brake shoes moves the adjuster 33 with the hand brake lever 18; there is no relative movement in the adjuster assembly and hence no extension of the screw strut.

Hydraulic actuation of the brake shoes frees the cross strut 31 of any transmitted load, the wedge head 34 of the screw strut pivots clear of the hand brake lever 18, and the pawl 35 rotates clockwise relative to the lever 18 to advance the ratchet wheel 27 and so extend the screw strut as previously described.

Figure 6:
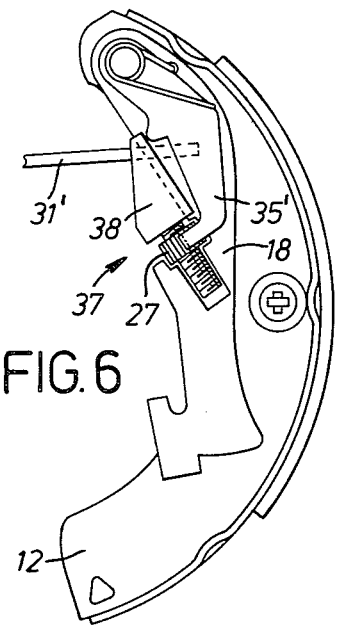
FIG. 6 shows the fourth embodiment of the invention.

The fourth embodiment of the invention, as shown in FIG. 6, has an adjuster 37 non-pivotably mounted on the hand brake lever 18. The cross strut 31 is guided, as in the previous example, by fixed lugs on the brake shoe (not shown). The screw strut carries a wedge head 38, slidably located on the hand brake lever 18, which is advanced on rotation of the ratchet wheel 27 by the spring biased pawl 35.

The operation of this embodiment is similar to that already described; on hydraulic actuation of the brake shoes the load of the pull-off springs holding the wedge head 38 sandwiched between the cross strut 31' and the lever 18 is released, thus allowing relative angular movement between the pawl 35' and the lever 18 to rotate the wheel 27 and so drive the wedge head 38 upward, as viewed.

Figure 7:
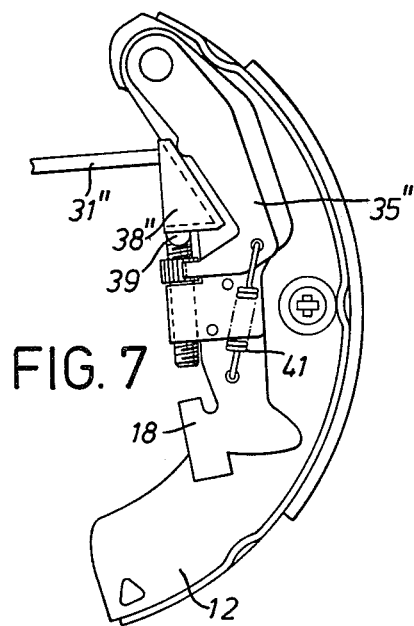
FIG. 7 is a modification of the brake depicted in FIG. 6 and comprising the fifth embodiment of the invention.

The final embodiment, as shown in FIG. 7, is a modification of the previous example in which the screw strut is out of line with the motion of the wedge head 38". A spade end 39 of the screw strut 31" locates in a slot at the base of the wedge 38". A tension spring 41 is arranged to bias the pawl 35" clockwise against the wedge head 38".

Operation of this embodiment is exactly as that described in the previous example, the spade end 39 travelling along the base of the wedge head 38" as the screw strut advances.

The preferred embodiments have all been described as being actuated when the brake shoes are moving to the brake applied position. Clearly the ratchet wheel of each adjuster could be arranged to be rotated as the brake shoes are moving under the action of the pull-off springs to the brake released position.

Although the invention has been described with specific reference to one type of drum brake, the embodiments are applicable to adjustment of single brake shoes. For example, in the embodiment shown in FIG. 2, the adjuster would operate to adjust only the brake shoe 11 if the cross strut 21' were fixed relative to the back plate. Provision of a pair of such adjusters would be necessary for a conventional twin leading shoe brake having one hydraulic cylinder for each brake shoe.

We claim:
1. In a drum brake:
  a brake drum;
  a pair of brake shoes each having a wearable friction lining;
  a fixed abutment between two adjacent ends of the brake shoes;
  actuating means between the other adjacent ends of the brake shoes for urging said shoes against the drum;
  a handbrake lever pivoted to one brake shoe adjacent the actuating means;
  a strut between the handbrake lever and the other brake shoe for urging the brake shoes against the drum on actuation of said handbrake lever; and
  self adjusting means for increasing the effective length of the strut on wear of the friction linings; said adjusting means comprising a pair of screw-threaded members and step by step means for relative rotation thereof on operation of said actuation means, said screw-threaded members being arranged substantially at right angles to the strut and one of the members having spacer means dirrectly interposed between the strut and one of the handbrake lever and other brake shoe, the position of the spacer means being variable by relative rotation of the screw-threaded members to change the spacing effect of the spacer means and thus the effective length of the strut.

2. A drum brake according to claim 1, wherein the self adjusting means are mounted on said other brake shoe, the spacer means being directly interposed between the strut and said other brake shoe.

3. A drum brake according to claim 2, wherein one of said screw threaded members is integral with the spacer means, rotation of the screw-threaded member changing the spacing effect of the spacer.

4. A drum brake according to claim 3, wherein the spacer means comprising a frusto-conical member whose axis is coaxial with said screw-threaded members.

5. A drum brake according to claim 1, wherein the self adjusting means are mounted on the handbrake lever, the spacer means being directly interposed between the strut and said handbrake lever.

6. A drum brake according to claim 5, wherein the spacer means comprises a wedge member slidably located on the handbrake lever to be urged between said lever and strut on relative rotation of the screw-threaded members.

7. A drum brake according to claim 5, wherein the spacer means comprises a frusto-conical member whose axis is co-axial with the screw-threaded members, relative rotation of the screw-threaded members urging the frusto conical member between said strut and handbrake lever.

* * * * *